Sept. 26, 1944.  A. A. BALK  2,359,018
SINE BAR FIXTURE
Filed Sept. 13, 1943

INVENTOR.
ALBERT A. BALK
BY Kurs Hudson Boughton & Williams
ATTORNEYS

Patented Sept. 26, 1944

2,359,018

UNITED STATES PATENT OFFICE 2,359,018

SINE BAR FIXTURE

Albert A. Balk, Garfield Heights, Ohio

Application September 13, 1943, Serial No. 502,089

2 Claims. (Cl. 33—174)

The present invention relates to sine bar instruments or fixtures used in inspection rooms, shops, etc., for checking angles, tapers and the like.

The principal object of the present invention is the provision of a novel and improved sine bar instrument or fixture which will be reliable in operation, simple in construction and convenient to use.

Other objects and advantages of the invention are the provision of a sine bar fixture so constructed and arranged that the moving parts will not wear excessively and wherein the various parts can be adjusted relative to each other to correct any inaccuracies which may occur therein.

Figure 1:
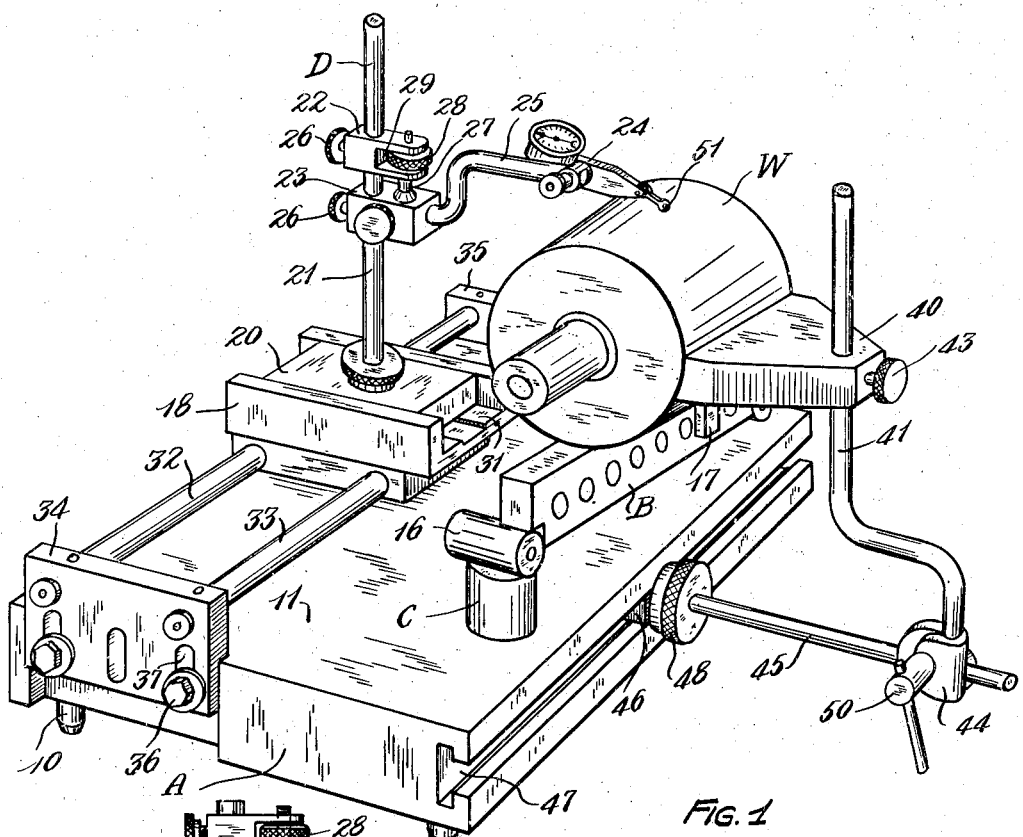
Figure 2:
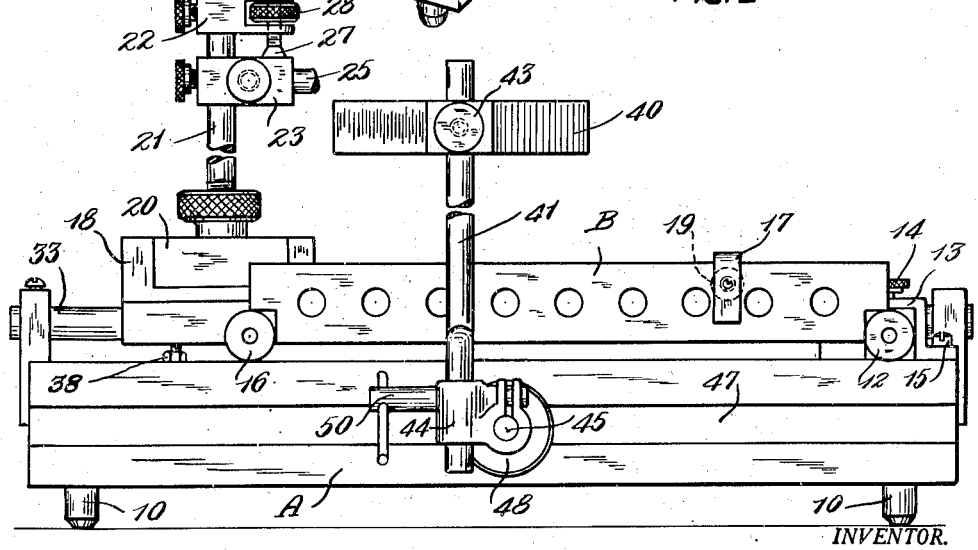

The invention resides in certain details of construction and combinations and arrangements of parts and further objects and advantages thereof will be apparent to those skilled in the art to which the invention relates from the following description thereof described with reference to the accompanying drawing forming a part of this specification, in which similar reference characters designate corresponding parts, and in which Fig. 1 is a perspective view of a sine bar fixture embodying the present invention; and Fig. 2 is a rear elevational view of the sine bar fixture shown in Fig. 1.

The usual sine bar fixture comprises a surface plate, a height gauge, a sine bar and a set of thickness gauges. In practice, the height gauge and sine bar are placed upon the surface plate. The work piece to be checked is placed upon the sine bar and one end of the sine bar is raised by the thickness gauges until the angular surface or taper to be checked is determined by the height gauge to be horizontal or parallel with the working surface of the surface plate, after which the angle or amount of taper is determined from the sine of the angle as found by dividing the height as measured by the thickness gauges by the length of the sine bar. Among the numerous disadvantages inherent in the aforesaid practice is the fact that the surface plate soon becomes worn and inactive due to the sliding of the height gauge thereover. The wear referred to is increased by the fact that the base of the height gauge adheres to the surface plate and will not readily move thereabout. Other disadvantages are the fact that the various parts become disassembled and are not always readily available for use. According to the provisions of the present invention, the height gauge or its equivalent is carried by a member slidably supported on parallel bars fixed to but preferably adjustable relative to the surface plate. This construction overcomes many of the objections referred to above.

Referring to the drawing, the reference character A designates a base, preferably in the form of a surface plate which, as shown, is adapted to be supported upon a bench or table or the like by feet 10 fixed to the underside of the base or surface plate proper. The upper or working surface 11 of the base or surface plate A is absolutely flat and supports the sine bar, designated generally by the reference character B, the right-hand button 12 of which, as viewed in the drawing, rests upon the surface 11 and is pivotally held in position thereon by a U-shaped bracket or sine bar clamp 13 which overlies the projecting end thereof. The sine bar clamp 13 is provided with a thumb screw 14, the lower end of which is adapted to engage the top of the button 12. As shown, the bracket 13 is secured to the upper surface plate A by the screws 15, however, any other suitable arrangement could be employed. The opposite or left-hand end of the sine bar B is adapted to be raised by thickness gauges C resting upon the working surface 11 of the base A and engaging underneath the left-hand button 16 of the sine bar. The sine bar B shown is of commercial construction, is ten inches long and the buttons 12 and 16 are fixed to the ends of the bar proper. As shown, the sine bar B includes a U-shaped member 17 engaging over the upper surface of the bar, which member constitutes a stop for holding work pieces placed thereon from sliding lengthwise of the bar when the free end is raised. The U-shaped member or work clamp 17 may be secured in any desired position along the sine bar by the clamp screw 19.

In addition to the sine bar B, the present instrument includes a member or carriage 18 for supporting a height gauge, designated generally by the reference character D. The height gauge D shown is of conventional construction and will not be described in detail. Suffice it to say that it comprises a vertical upright or indicator bar 21 secured to a base or indicator slide 20, sliding clamps 22 and 23 carried by the indicator bar 21 and a dial indicator 24 carried by an indicator bar 25 fixed to the lower clamp 23. The sliding clamps 22 and 23 provide means for adjusting the dial indicator 24 vertically and are provided with knurled clamp screws 26 for securing them in any adjusted position. The sliding clamps 22 and 23 are operatively connected together by a screw 27 fixed in the lower clamp 23 and having a knurled nut 28 threaded on the upper end thereof. The nut 28 is located in a slot 30 in the upper clamp 22. The construction referred to provides means for obtaining a fine vertical adjustment of the dial indicator 24. The base or indicator slide 20 of the height gauge D is slidably secured in a groove 31 formed in the upper side of the member 18. The groove 31 extends in a direction transversely of the sine bar B and the lower surface thereof upon which the indicator slide 20 rests is parallel or substantially parallel with the surface 11 of the surface plate A. The construction is such that the dial indicator 24 can be moved transversely of the sine bar B.

The member 18 which carries the height gauge D is slidably supported on two parallel bars 32 and 33 fixed to the base A. As shown, opposite ends of the bars 32 and 33 are connected to members 34 and 35 fixed to the base A by means permitting adjustment thereof relative to the working surface 11. As shown, the members 34 and 35 are fixed to the surface plate or base A by bolts 36 projecting through elongated slots 37 in the members 34 and 35 and threaded into tapped holes in the ends of the member A. Preferably the members 34 and 35 are located in vertical grooves or the like formed in the ends of the member A so as to better maintain their vertical position as they are adjusted up and down. The parallel bars 32 and 33 extend lengthwise of the sine bar, that is, in a direction parallel with the projection of the sine bar on the surface 11 and are so positioned or located with respect to the surface 11 that when the member 18 is moved lengthwise thereof, the member 18 and, in turn, the dial indicator gauge 24 travel in a plane parallel with the working surface 11 of the surface plate A.

The parallel bars 32 and 33 are made of extremely hard material, ground and lapped, and are subject to substantially no wear by the movement of the member or carriage 18 therealong. Obviously the parallel bars must be of sufficient size so that they will not sag under the weight of the carriage 18 and the height gauge assembly D as they are moved therealong. In some instances, it may be desirable to operate the fixture with the carriage 18 located at one position for a considerable period of time, in which event provision is made for supporting the weight of the carriage and height gauge assembly on the surface plate A in the form of an adjustable screw 38 threaded into a suitable tapped aperture in the underside of the carriage 18, the head of which screw is adapted to rest upon or engage the surface 11 of the surface plate A.

The present invention also contemplates the provision of means for holding work upon the sine bar B in the form of a work rest 40 slidable along a work rest post 41 and adapted to be fixed in any position to which it might be moved therealong by a knurled thumb screw 43 threaded into a tapped aperture in the work rest 40, the inner end of which screw is adapted to engage the work rest post 41. The work rest post 41 is carried by a swivel nut 44 carried by the shank 45 of a T-bolt, the head 46 of which is positioned in a T-slot 47 in the side of the surface plate A adjacent to and parallel with the sine bar B. The portion of the shank 45 of the T-bolt adjacent to the head 46 is enlarged and threaded and provided with a clamp nut 48 for fixedly securing the T-bolt in any desired position. The swivel nut 44 includes a clamping member 50 for fixedly securing it in any adjusted position along the shank 45 of the T-bolt.

In Fig. 1 of the drawing, the sine bar fixture of the present invention is shown as being employed to check the taper of a cone-shaped work piece W positioned upon the sine bar B and held in place thereon by the U-shaped member 17 and the work rest 40. The left-hand end of the sine bar B was raised by the thickness gauge C until the upper side of the work piece W became parallel with the working surface 11 of the surface plate A as determined by the hand of the dial indicator gauge 24 remaining stationary as the work engaging plunger 51 thereof was moved lengthwise therealong by sliding the carriage 18 along the bars 32 and 33. The bars 32 and 33 can be readily set or their position checked by causing the work engaging plunger 51 of the dial indicator gauge 24 to engage the working surface 11 of the surface plate A and by then moving the carriage 18 along the bars. Any necessary adjustment can be readily made by moving either or both of the members 34 and 35 in one direction or another. Because of the fact that it is not necessary to move the slide 20 of the height gauge D in the groove 31 of the carriage 18 any great amount, little, if any, wear occurs at this point.

From the foregoing description of the preferred embodiment of the invention, it will be apparent that the objects heretofore enumerated and others have been accomplished and that a new and improved sine bar fixture has been provided which is simple in construction, convenient and accurate in operation and in which the various parts can be adjusted to eliminate any errors which may arise therein. While the preferred embodiment of the invention has been described in considerable detail, I do not wish to be limited to the particular construction shown, which construction may be varied within the scope of this invention and it is my intention to hereby cover all adaptations, modifications and uses thereof which come within the practice of those skilled in the art to which the invention relates and which come within the spirit and scope of the appended claims.

Having thus described my invention, what I claim is:

1. In a sine bar fixture of the character described, the combination of a surface plate, a sine bar positioned on said surface plate, means for pivotally connecting one end of said sine bar relative to said surface plate, a plurality of parallel bars fixed to said surface plate, and a member slidably supported on said bars and adapted to carry a height gauge, said bars extending in a direction generally parallel to the projection of said sine bar on the surface of said surface plate and being so positioned that a height gauge supported on said member travels in a plane parallel to the surface of said surface plate upon said member being moved along said bars.

2. In a sine bar fixture of the character described, the combination of a surface plate, a sine bar positioned on said surface plate, means for pivotally connecting one end of said sine bar relative to said surface plate, a plurality of parallel bars fixed to said surface plate, a member slidably supported on said bars and adapted to carry a height gauge, said bars extending in a direction generally parallel to the projection of said sine bar upon the working surface of said surface plate and being so positioned that a height gauge supported on said member travels in a plane parallel to the surface of said surface plate upon said member being moved along said bars, and means for adjusting said bars relative to said surface plate.

ALBERT A. BALK.